G. A. OHL, Jr.
POWER PRESS.
APPLICATION FILED DEC. 21, 1910.
1,000,688.
Patented Aug. 15, 1911.
5 SHEETS—SHEET 1.
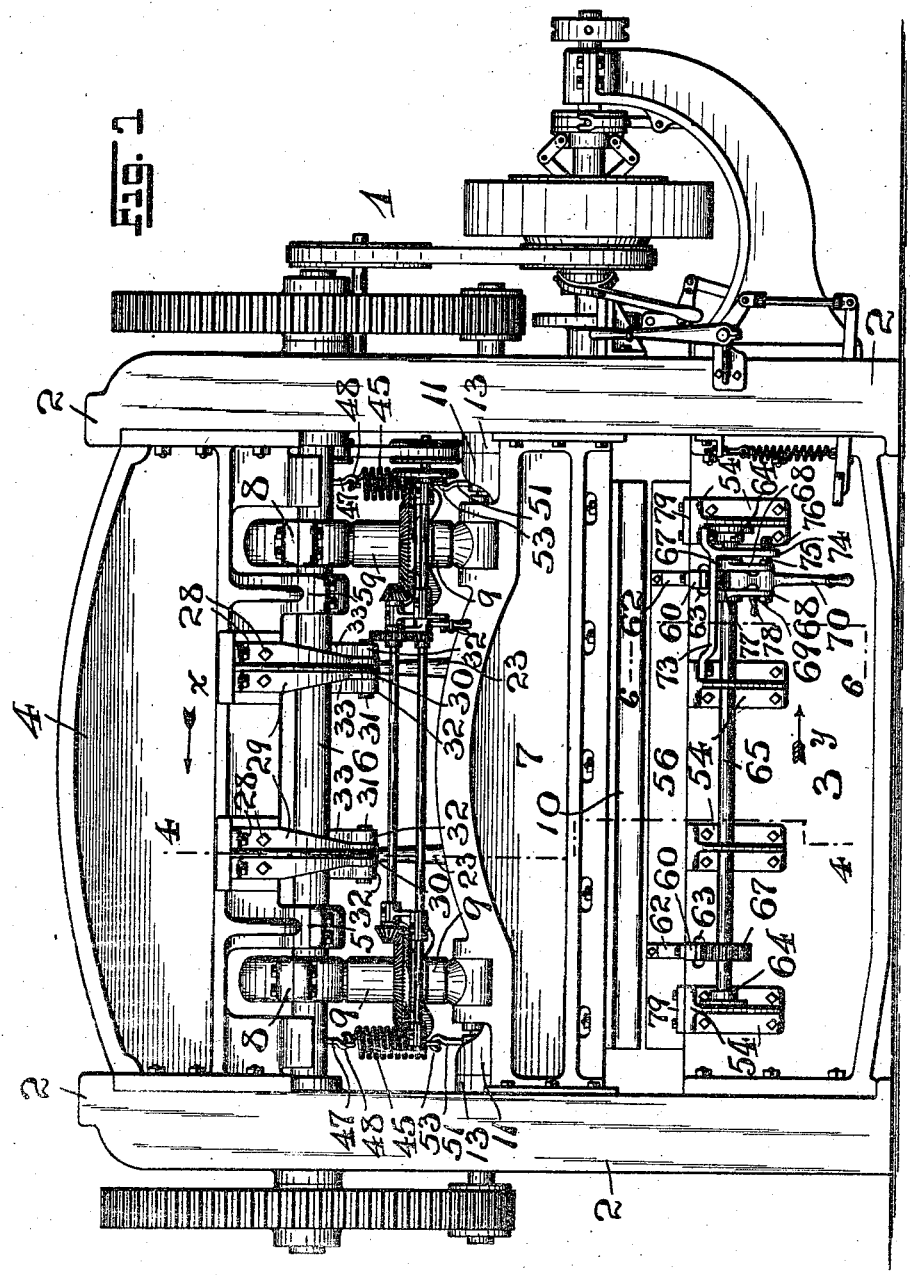
WITNESSES:
INVENTOR:
George A. Ohl, Jr.,
BY Fraentzel and Richards,
ATTORNEYS G. A. OHL, Jr.
POWER PRESS.
APPLICATION FILED DEC. 21, 1910.
1,000,688.
Patented Aug. 15, 1911.
5 SHEETS—SHEET 2.
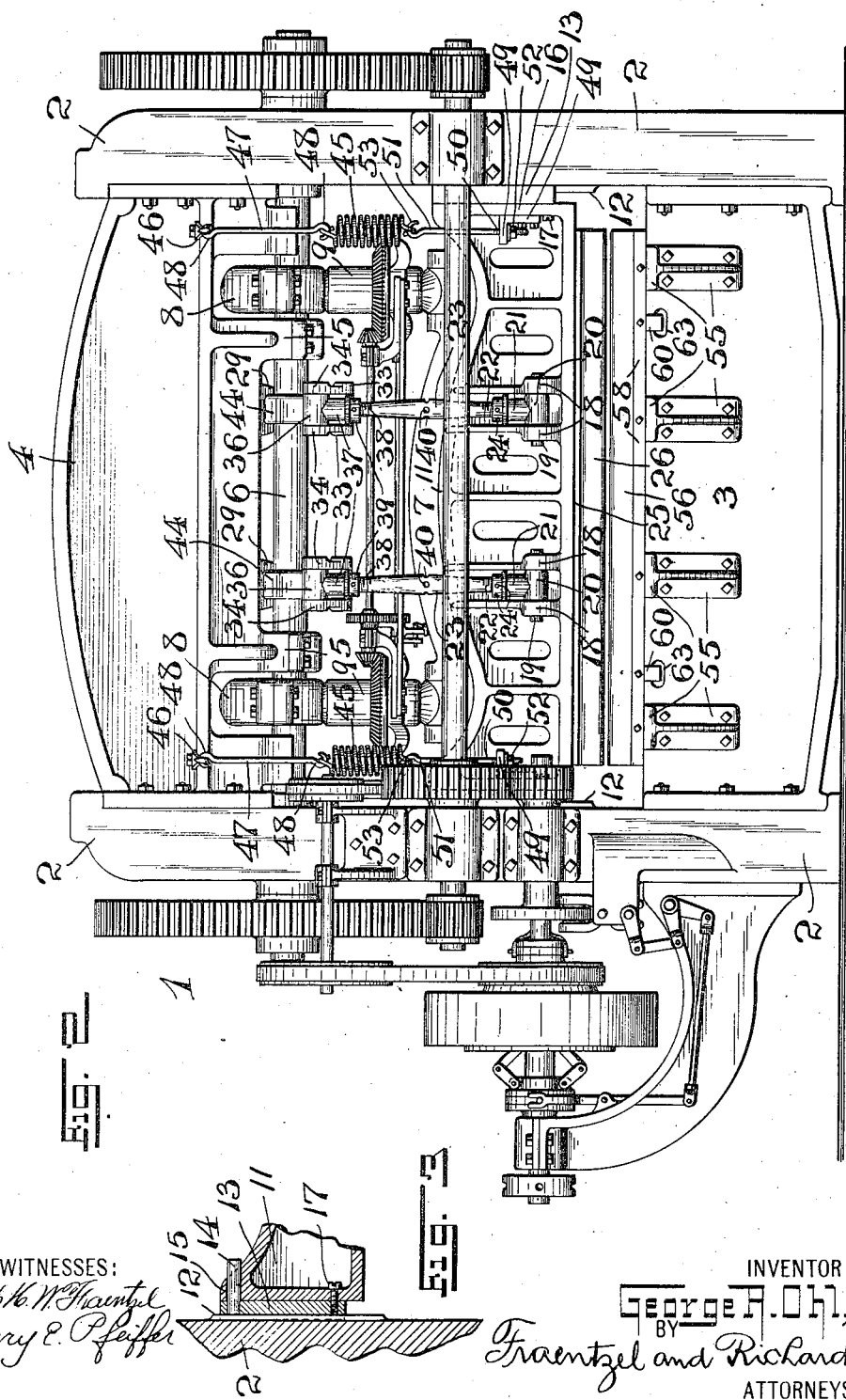

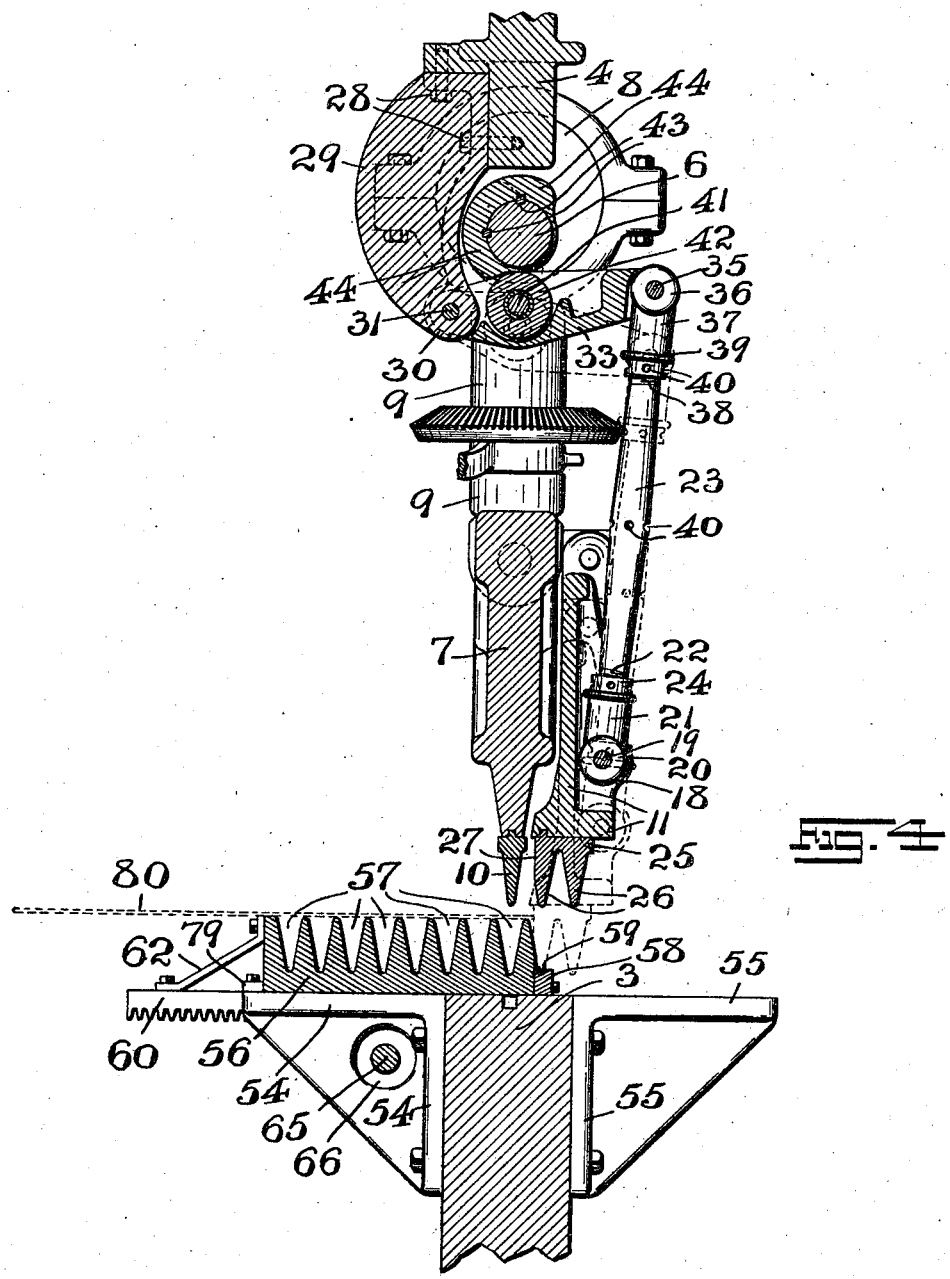

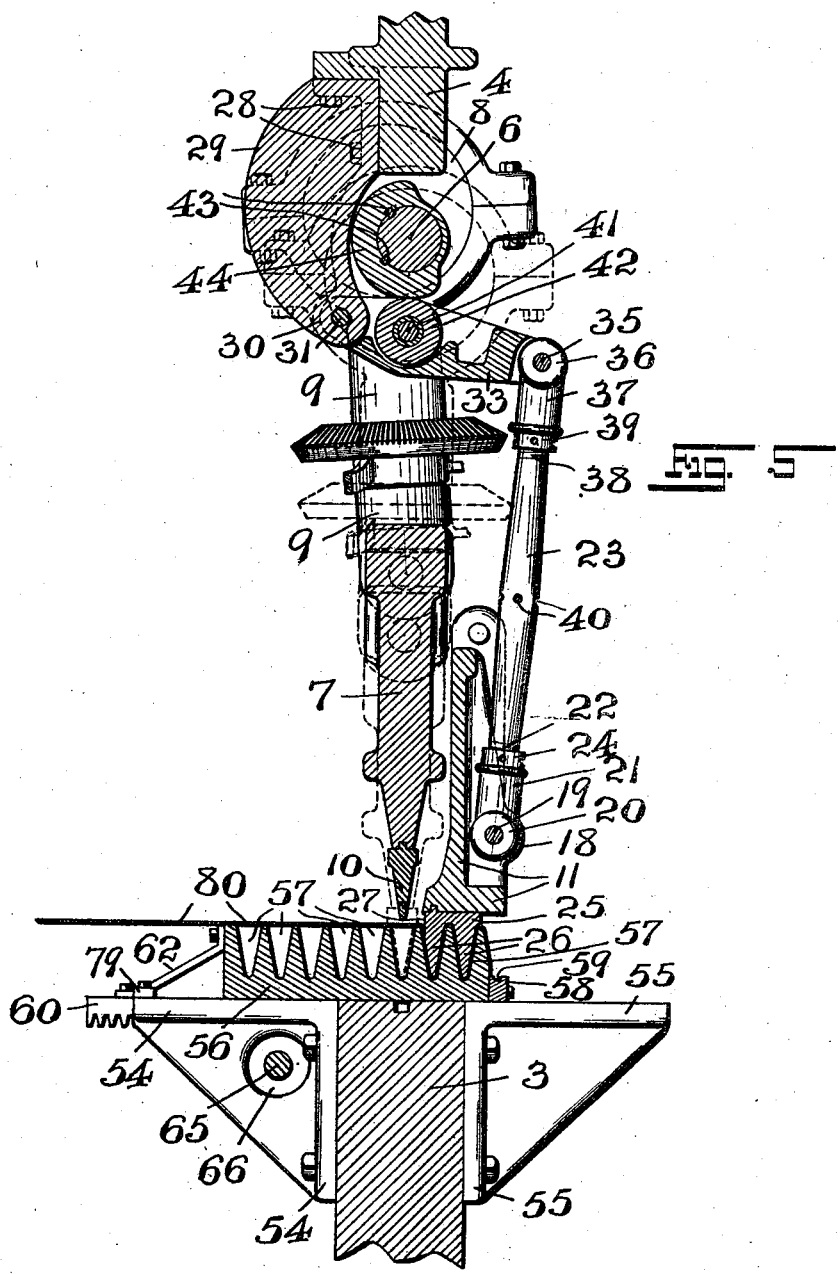

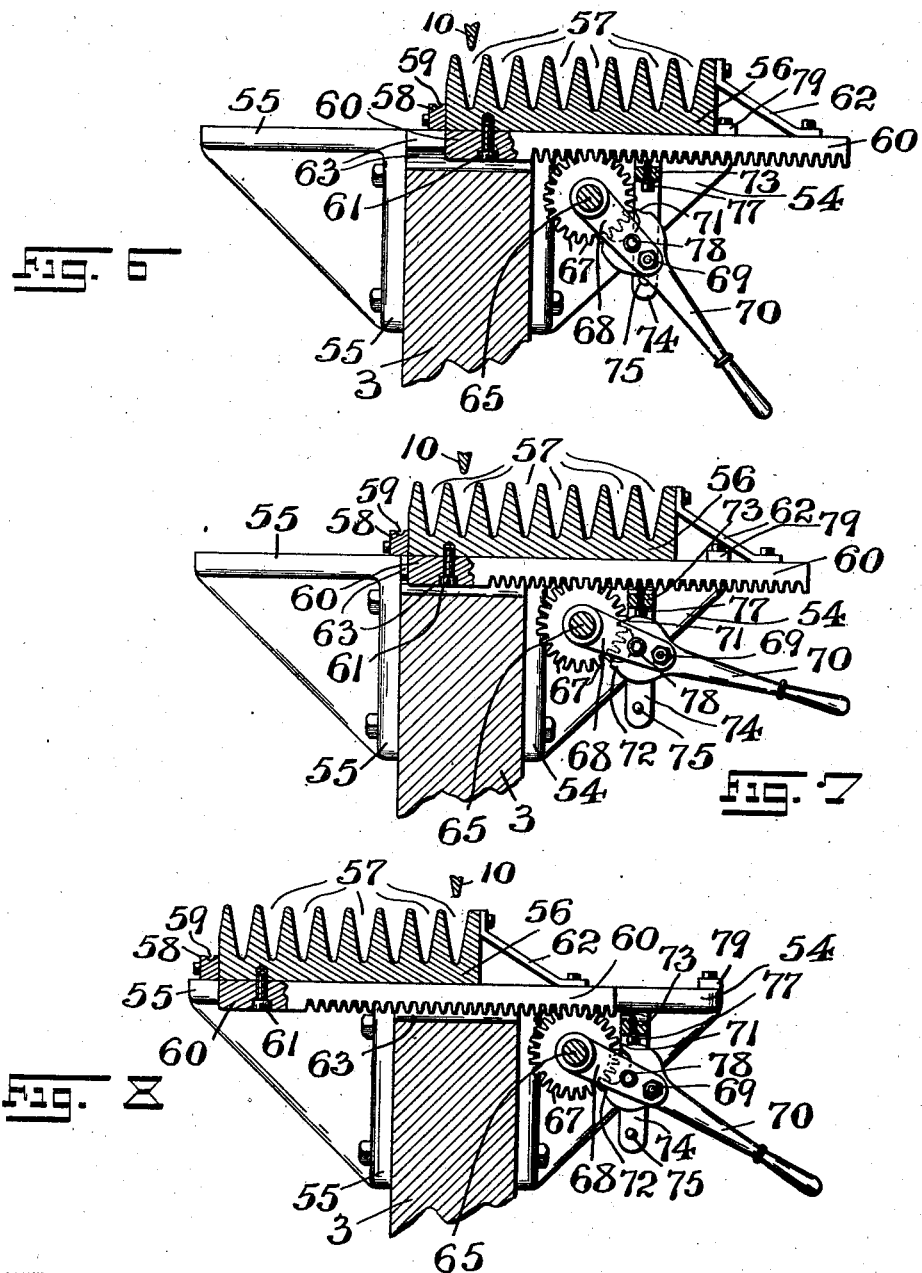

UNITED STATES PATENT OFFICE.

GEORGE A. OHL, JR., OF NEWARK, NEW JERSEY, ASSIGNOR TO GEORGE A. OHL & CO., A CORPORATION OF NEW JERSEY.

POWER-PRESS.

1,000,688.  Specification of Letters Patent.  Patented Aug. 15, 1911.

Application filed December 21, 1910. Serial No. 598,603.

*To all whom it may concern:*

Be it known that I, GEORGE A. OHL, Jr., a citizen of the United States, residing at Newark, in the county of Essex and State of New Jersey, have invented certain new and useful Improvements in Power-Presses; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in that class of power presses which are employed for the purposes of bending metal, and more particularly for corrugating or crimping sheet-metal and similar materials.

The present invention, therefore, has for its principal object to provide improvements in power presses, whereby the operations of bending sheets of metal and forming or providing the same with extraordinarily deep corrugations, which may be from four to eight inches in depth, are greatly simplified; and, furthermore, to provide a machine, by means of which the finished product produced is rendered more perfect and absolutely true and uniform; in other words, the novel improvements, forming the substance of the present invention, rendering the manufacture of deeply corrugated plates, used in the construction of electrical transformers, easy, quick, perfect, and with a minimum of handling.

The present invention, therefore, provides improvements in power presses for the purposes herein-above set forth, comprising a movable female die, and an automatic clamping or work-holding means, coöperating with said movable female die, and a reciprocating forming or male die.

Other objects of the present invention not at this time more particularly enumerated will be clearly understood from the following detailed description of the present invention.

With the various objects of the present invention in view, the said invention consists, primarily, in the novel construction of the improvements in power-presses hereinafter set forth; and, furthermore, this invention consists in the several novel arrangements and combinations of the various devices and parts, as well as in the details of the construction thereof, all of which will hereinafter be more fully described in the following specification, and then finally embodied in the clauses of the claim which are appended to and which form an essential part of this specification.

The invention is clearly illustrated in the accompanying drawings, in which:—

Figure 1 is a front elevation of a power-press provided with the improvements made according to and embodying the principles of the present invention; and, Fig. 2 is a rear elevation of the same. Fig. 3 is a detail vertical longitudinal section of a portion of the housing of the power press and a clamp-carrier illustrating, more particularly, the means of slidably supporting the latter upon the former. Fig. 4 is a detail transverse vertical section, taken on line 4—4 in said Fig. 1, looking in the direction of the arrow $x$; and Fig. 5 is a similar section, taken on the same line, but illustrating different positions of the parts, while performing their functions, both said Figs. 4 and 5 being drawn on an enlarged scale. Fig. 6 is a detail vertical cross section taken on line 6—6 in said Fig. 1, looking in the direction of the arrow $y$; and Figs. 7 and 8 are similar sectional views, illustrating different positions of the parts while performing their functions, said Figs. 6, 7 and 8 being also drawn on an enlarged scale.

Similar characters of reference are employed in all of the hereinabove described views, to illustrate corresponding parts.

Referring now to the several figures of the drawings, the reference-character 1 indicates a complete power press, comprising a pair of end-frames or housings 2, between which is secured a bed or supporting table 3, the same extending between the lower ends of said end-frames or housings, and a top-frame 4 secured between the upper end-portions of said end-frames or housings. Said top-frame 4 is provided with suitably disposed shaft-supporting hangers 5 in which is rotatably mounted a suitably driven shaft 6, the ends of which are journaled in said end-frames or housings 2. Slidably arranged, so as to be capable of a reciprocatory movement in a vertical plane between said end-frames or housings 2, is a hammer or slide 7. The reciprocatory movements of said hammer or slide 7 are produced by means of a pair of eccentrics 8 which are arranged upon and are operated by the said driven shaft 6, said hammer or slide 7 being operatively connected with said eccentrics 8 by means of adjustable suspension-arms 9. Suitably secured to said hammer or slide 7 is a male-die 10 adapted to be operated by the said hammer or slide to form the desired bend in the material which is to be worked upon by the power-press. Arranged adjacent to said hammer or slide 7 is a clamp-die carrier 11, which is slidably mounted between the end-frames or housings 2, so as to be likewise capable of reciprocatory movements in a vertical plane, in the following manner:—Each end-frame or housing 2 is provided with a longitudinally extending rib or guide 12, and arranged upon each rib or guide 12, by means of a corresponding groove, is a slide-block 13, which is adapted to move up and down upon said rib or guide 12, each slide-block 13 being provided with an outwardly projecting stud 14. Each end of said clamp-die carrier 11 is provided with a suitably disposed perforation or hole 15, said perforations or holes being adapted to receive the said studs 14 so as to pivotally connect the clamp-die carrier 11 with the respective slide-blocks 13, the purpose of said pivotal connection being hereinafter more fully explained. For the purpose of retaining said clamp-die carrier 11 in proper rigidity and alinement with said slide-blocks 13, the vertical flanges 16 at the ends of said clamp-die carrier 11 carry lock-screws 17, the shanks of which screw into said slide-blocks 13 as shown more particularly in Fig. 3 of the drawings. Said clamp-die carrier 11 is provided upon its outer face with suitably located pairs of bearing-lugs 18 in which are journaled studs 19. Pivotally mounted upon said studs 19 are knuckle-joints 20 which are provided with upwardly extending shanks 21 adapted to receive the screw-threaded end-portions 22 of suitable connecting rods 23, each screw-threaded end-portion 22 of said connecting rods 23 having arranged thereon a locking-collar 24. Connected with the lower end of said clamp-die carrier 11, in any suitable manner, is a clamp-die 25 having die-shaped members 26, which are substantially of the same conformation as that of said male-die 10 connected with said hammer or slide 7. The side face of said clamp-die 25, which faces said male-die 10, is provided with a gage-surface 27 which, when the clamp-die 25 is lowered, as indicated in the dotted position thereof shown in Fig. 4 of the drawings, and when the work is about to be commenced upon a sheet of metal or other material, serves as a gage or stop for positioning the sheet of metal, or other material, ready for the first bend to be made therein by the descent of said hammer or slide 7 with the male-die 10. Secured in proper locations, upon said top-frame 4, by means of bolts 28, are brackets 29 which support in their free ends 30 suitable studs 31. Pivotally mounted upon the projecting ends of said studs 31 are the bearing lugs 32 of suitably formed lever-members 33, said lever-members extending rearwardly beneath said driven shaft 6, and being provided at their outer ends with bearing-lugs 34 in which are journaled studs 35. Pivotally mounted upon said studs 35 are knuckle-joints 36 which are provided with downwardly extending shanks 37 adapted to receive the screw-threaded ends 38 of the previously mentioned connecting rods 23. Arranged upon said screw-threaded ends 38 of the connecting rods 23 are locking-collars 39. Each of said connecting rods 23 is also provided with suitably disposed holes or perforations 40, for receiving a lever-bar, so that the said connecting rod may be turned, the respective screw-threaded ends 38 and 22 of the said connecting rods 23 being, respectively, provided with right and left screw-threads, so that when said connecting-rods are turned the position of said clamp-die carrier 11 and its clamp-die may be thereby regulated and adjusted with relation to a female die, as will be clearly evident from an inspection of the drawings.

Supported in a proper position in each lever-member 33 is a stud 41 upon which is rotatably mounted an anti-friction roller 42. Secured upon said main shaft 6, by means of keys 43 or other suitable fastening means, are cam-members 44, the same being adapted to engage said anti-friction rollers 42, upon the rotation of said driven shaft 6, to cause the oscillations of said lever-members 33, said motion being imparted through said connecting rods 23 to said clamp-die carrier 11, whereby the reciprocatory movements of the latter in a vertical plane are obtained. The cam-members 44 are placed upon said driven shaft 6, in such a manner, so that their revolutions will properly operate and time the reciprocatory movements of said clamp-die carrier with regard to its relative movements in point of time with the reciprocatory movements of the hammer or slide 7, caused by the eccentrics 8, which are also operated by means of said driven shaft 6, all of which will be clearly apparent from an inspection of Figs. 4 and 5 of the accompanying drawings. The downward movement of the said clamp-die carrier 11 is produced by means of the said cam-members 44 operating through the lever-members 33 and the connecting rods 23, hereinabove mentioned, the upward or return movement of the carrier 11, however, being caused by means of a pair of coiled springs 45. These springs 45 are supported from the top-frame 4, by means of hook-shaped members 46, which are bolted to said frame, and connecting links 47 having hook-shaped ends 48 for engaging said hook-shaped members 46 at one end and the said coiled springs 45 at their other ends. In a like manner, there are bolted to each of said vertical flanges 16 of said clamp-die carrier 11 suitably perforated bracket-pieces 49. Extending through said bracket-pieces 49 are the screw-threaded ends 50 of suitable connecting-links 51, which are adjustably connected with said bracket-pieces by means of nuts 52. The upper ends of said connecting links 51 are provided with hook-shaped ends 53 for engaging the lower ends of said coiled springs 45. Secured upon the front face of the bed or supporting table 3 of the machine are a plurality of supporting brackets 54, the upper and outwardly extending faces of which are level with the upper surface of said bed or supporting table 3 so as to provide a forward extension of the latter. In like manner, there is secured upon the rear face of said bed or supporting table 3 a plurality of supporting brackets 55 whose upper and outwardly extending faces are likewise level with the upper surface of said bed or supporting table 3 and provide a rearward extension of the latter. Arranged so as to be supported by said bed or supporting table 3, and adapted to slide laterally upon the said bed or supporting table, and said supporting brackets 54 and 55 connected therewith, is a female-die 56, the same being provided with a plurality of die-forms 57 having a conformation which is the complement of that of the male-die 10. Secured by means of stud-screws, or the like, to the rear side of said female die 56 is an alining-block 58 which is provided upon its upper face with a longitudinally extending receiving groove 59 adapted to be engaged by a portion of said clamp-die 25 when the female-die 56 is in its normal initial position, ready for the commencement of the work, which is to be performed, as indicated by the dotted position of said clamp-die 25 shown in Fig. 4 of the accompanying drawings. Connected with the bottom of said female-die 56, in suitable positions, are a pair of racks 60, said racks being secured to said die by means of screws 61 and suitable braces 62, or any other suitable fastening means. Said racks 60 also extend forwardly beyond the front of said female die, substantially in the manner shown, and the said bed or supporting-table 3 is provided with suitable grooves or passages 63 which permit the operative passage therethrough of said racks when the female die 56 is moved laterally upon the said bed or supporting table. Suitably secured upon each of said supporting brackets 54, which are arranged adjacent to the ends of said bed or supporting table 3, are bearing-portions 64 in which are journaled the respective ends of a transversely extending shaft 65, said shaft extending through suitable holes or openings 66 in the intervening supporting brackets 54. The said shaft 65 is provided in proper locations with a set of gear-wheels 67, the teeth of which are in mesh with the teeth of said racks 60. Mounted, so as to rotate upon said shaft 65, are a pair of link-members 68, one on either side of one of said gear-wheels 67, and pivotally mounted upon a suitable stud 69, supported between the free ends of said link-members 68, is a pawl-lever 70 which is provided with an upper tooth or projection 71 and a lower tooth or projection 72, either of which may be brought into operative engagement with the teeth of said gear wheel 67.

Suitably secured to a pair of said supporting brackets 54, adjacent to said pawl-lever 70, is a bridge-piece 73 provided with a downwardly extending arm 74 in which is movably arranged a stop-pin 75, said pin having a finger-piece 76 for manipulating the same. Said stop-pin 75, when in its operative position, serves as a stop or rest for limiting the downward movement of the link-members 68 and the said pawl-lever 70 connected therewith. Arranged so as to be adjustably supported by means of said bridge-piece 73 is a stop-member 77 which limits the upward stroke or movement of said pawl-lever 70, and connected with one of said link-members 68 is a handle or grip-piece 78, by means of which the said link-members may be raised and said lower projection or tooth 72 of the pawl-lever 70 brought into engagement with the teeth of said gear-wheel 67. Secured by means of stud-screws, or other suitable devices, to the outer ends of certain of said supporting brackets 54 are a pair of stop-blocks 79 which serve to limit the outward sliding movement of the female die 56 and bring the same to rest in its normal initial position ready to commence its work with the power-press. When said female-die 56 is brought into its normal initial position, ready to commence the work, the clamp-die carrier 11 is brought into such a position, so that one of said die-shaped members 26 engages the groove 59 of the alining block 58. A sheet of metal, or other material, as 80, is then pushed over said female die 56, until its edge is brought against the gage-surface 27. The power press is now started, the driven shaft 6 thereof being driven and controlled by the ordinary power-press operating mechanism heretofore known. The revolutions of the driven shaft 6 operating through said eccentrics 8 and suspension arms 9 now causes a downward movement of said hammer or slide 7, carrying with the same the said male-die 10, which, coacting with the first die-form 57 of the female die 56, makes the first bend in said sheet of metal or other material 80. The continued revolutions of said shaft 6, raises said hammer or slide 7 and the male die 10 back to their normal initial positions, and synchronously therewith, the pressure of the cam-members 44 is released from said lever-member 33, whereby the coiled springs 45 are permitted to return said clamp-die carrier 11 and the clamp-die 25 to their normal initial positions. The revolutions of said shaft 6 is thereupon stopped. It is now necessary to shift said female-die 56. This is done without disturbing the sheet of metal or other material 80 in any way, it not being necessary to touch or handle the same at any time during the bending operations. To shift said female die 56, so as to register the next die-form 57 thereof in proper position beneath the male-die 10, ready to make the next bend or corrugation in said sheet of metal or other material 80, the pawl-lever 70 is grasped and lifted. This lifting movement throws into engagement with said gear-wheel 67 the upper projection or tooth 71, and the continued upward movement of said pawl-lever rotates said gear-wheel 67 and the shaft 65, and also the companion gear-wheel 67. The said gear-wheels 67 being in mesh with the teeth of the racks 60, secured to the under side of said female-die 56, causes a rearward sliding movement of the latter, carrying said sheet of metal or other material 80 with it. The pitch of the teeth of said gear-wheels 67 in their relation to the teeth of the racks 60 is such, so that when said pawl-lever 70 is stopped in its upward movement by said stop-member 77, the proper shift of said female-die has been obtained, and the teeth of said gear-wheels 67 are in such a position, that when the pawl-lever 70 is dropped to its normal initial position, they are ready to again properly receive said upper projection or tooth 71, when said pawl-lever is again lifted. After the female-die 56 has thus been shifted, the power-press is again put in operation to produce the revolution of the shaft 6. Upon the renewed operation of said shaft 6, the said cam-members 44, which are quick-acting, as compared with said eccentrics 8, force downwardly the said lever-members 33, and as has been described, cause a downward movement of said clamp-die carrier 11 in advance of the downward movement of said hammer or slide 7 and male-die 10. This movement causes the die-shaped members 26 of said clamp-die to grip, in connection with said female-die 56, such portion of the sheet of metal or other material 80 which has already been bent or formed, to tightly hold the same and will prevent any drawing out from the female die or distortion of the sheet of metal, while the next bend is being formed, the position of said clamp-die-carrier and clamp-die when performing this function being clearly illustrated in Fig. 5 of the accompanying drawings. After said clamp-die carrier 11 has thus descended, the slower eccentrics 8 cause the descent of the hammer or slide 7 and the male-die 10, which thereupon form the next bend or corrugation in said sheet of metal, or other material. These operations, herein-above just described, are continued until the female-die 56 has been shifted to its rearward limit, and the corrugated sheet of metal, or other material has been completed.

In order to return the female-die 56 to its normal initial position, said link-members 68 are lifted, by hand, by means of said handle or grip-piece 78; and, when raised, said pawl-lever 70 is pressed downwardly so as to throw into engagement with said gear-wheel 67 the lower projection or tooth 72. Said stop-pin 75 is pulled outwardly out of the path of said descending pawl-lever, so that a long stroke thereof may be obtained to quickly rotate the gear-wheels 67 and shaft 65 in a reverse direction, and thus carry back said female die 56 to said stops 79, after which said pawl-lever 70 and adjacent mechanism are caused to resume their normal initial positions. Should it be desirable to use the power press with other dies, and for other purposes, without using said clamping mechanism, the lock-screws 17 may be removed, the coiled springs 45 disconnected from their supporting relation with said clamp-die carrier 11, and the latter allowed to move downwardly, the same being swung outwardly upon said studs 14 and then jacked up out of the way, thereby permitting the operation of the hammer or slide 7 without the accompanying operations of said clamp-die carrier 11.

The present invention provides a means whereby plates having extraordinarily deep corrugations may be made with ease and despatch, and without the necessity of the manipulation and handling of the sheet of metal or other material to be worked upon, other than registering the sheet upon the female die before making the first bend and the final removal in the corrugated sheet. Furthermore, by means of the present invention, said sheets are provided with corrugations which are absolutely uniform and in perfect alinement with relation one to the other.

Of course, it will be clearly understood, that various changes may be made in the several arrangements and combinations of the various mechanisms and devices, as well as in the details of the construction of the same, without departing from the scope of the present invention, as described in the foregoing specification, and as defined in the claims which are appended to the said specification. Hence, I do not limit my invention to the exact arrangements and combinations of the various mechanisms and the devices as described in the said specification, nor do I confine myself to the exact details of the construction of the various parts of the same as illustrated in the accompanying drawings.

I claim:—

1. In a power press, a reciprocating hammer, a male die connected therewith, a reciprocating clamp-die carrier, a clamp-die connected therewith, a driven shaft, eccentrics operated by said driven shaft, suspension rods connecting said eccentrics with said hammer, means operated by said driven shaft for causing a downward movement of said clamp-die carrier in advance of said hammer, a female die, and means for producing lateral movements of said female die.

2. In a power-press, a reciprocating hammer, a male die connected therewith, a reciprocating clamp-die carrier, a clamp-die connected therewith, a driven shaft, eccentrics operated by said driven shaft, suspension rods connecting said eccentrics with said hammer, means operated by said driven shaft for causing a downward movement of said clamp-die carrier in advance of said hammer, springs for retracting said clamp-die carrier, a female-die, and means for producing lateral movements of said female-die.

3. In a power-press, a reciprocating hammer, a male die connected therewith, a reciprocating clamp-die carrier, a clamp-die connected therewith, a driven shaft, eccentrics operated by said driven shaft, suspension rods connecting said eccentrics with said hammer, means operated by said driven shaft for causing a downward movement of said clamp-die carrier in advance of said hammer, springs for retracting said clamp-die carrier, a female-die provided with a plurality of die-forms the complement of said male-die, and means for producing lateral movements of said female-die.

4. In a power press, a reciprocating hammer, a male-die connected therewith, a reciprocating clamp-carrier, a clamp-die connected therewith, means for causing the downward movement of said clamp-die carrier in advance of said hammer, springs for retracting said clamp-die carrier, a bed or supporting table, supporting brackets connected with said bed or supporting table, a female-die provided with a plurality of die-forms the complement of said male-die supported upon said bed or supporting table and said supporting brackets, racks secured to said female-die, a transverse-shaft, bearings connected with certain of said supporting brackets for mounting said transverse shaft, gear-wheels on said shaft in mesh with said racks, and means for rotating said transverse shaft and gear-wheels in either direction so as to produce lateral movements of said female-die.

5. In a power press, a reciprocating hammer, a male-die connected therewith, a reciprocating clamp-carrier, a clamp-die connected therewith, means for causing the downward movement of said clamp-die carrier in advance of said hammer, springs for retracting said clamp-die carrier, a bed or supporting table, supporting brackets connected with said bed or supporting table, a female-die provided with a plurality of die-forms the complement of said male-die supported upon said bed or supporting table and said supporting brackets, racks secured to said female-die, a transverse-shaft, bearings connected with certain of said supporting brackets for mounting said transverse shaft, gear-wheels on said shaft in mesh with said racks, and means for rotating said transverse shaft and gear-wheels in either direction so as to produce lateral movements of said female-die, comprising link-members pivotally mounted upon said transverse shaft, a stud supported in the free ends of said link-members, a pawl-lever pivotally mounted on said stud, an upper and lower tooth connected with said pawl-lever, either of which may be caused to engage the teeth of one of said gear-wheels, and stops for limiting the upward and downward movement of said pawl-lever.

6. In a power-press, a reciprocating hammer, a male-die connected therewith, a reciprocating clamp-die carrier, a clamp-die connected therewith, a driven-shaft, eccentrics operated by said driven shaft, suspension rods connecting said eccentrics with said hammer, means operated by said driven shaft for causing a downward movement of said clamp-die carrier in advance of said hammer, coiled springs for retracting said clamp-die carrier, a bed or supporting table, supporting brackets connected therewith, a female-die provided with a plurality of die-forms the complement of said male-die supported upon said bed or supporting table and said supporting brackets, racks secured to said female-die, a transverse shaft, bearings connected with certain of said supporting brackets for mounting said transverse shaft, gear-wheels on said shaft in mesh with said racks, and means for rotating said transverse shaft and gear-wheels in either direction so as to produce lateral movements of said female-die.

7. In a power-press, a reciprocating hammer, a male-die connected therewith, a reciprocating clamp-die carrier, a clamp-die connected therewith, a driven-shaft, eccentrics operated by said driven shaft, suspension rods connecting said eccentrics with said hammer, means operated by said driven shaft for causing a downward movement of said clamp-die carrier in advance of said hammer, coiled springs for retracting said clamp-die carrier, a bed or supporting table, supporting brackets connected therewith, a female-die provided with a plurality of die-forms the complement of said male-die supported upon said bed or supporting table and said supporting brackets, racks secured to said female-die, a transverse shaft, bearings connected with certain of said supporting brackets for mounting said transverse shaft, gear-wheels on said shaft in mesh with said racks and means for rotating said transverse shaft and gear-wheels in either direction so as to produce lateral movements of said female-die, comprising link-members pivotally mounted on said transverse shaft, a stud supported in the free ends of said link-members, a pawl-lever pivotally mounted on said stud, an upper and lower tooth connected with said pawl-lever either of which may be caused to engage the teeth of one of said gear-wheels, and stops for limiting the upward and downward movements of said pawl-lever.

8. In a power-press, a reciprocating hammer, a male-die connected therewith, a reciprocating clamp-die carrier, a clamp-die connected therewith, the same being provided with a plurality of die-shaped members and a gage-surface on one of its lateral faces, means for causing the downward movement of said clamp-die carrier in advance of said hammer, a female-die, and means for producing lateral movements of said female-die.

9. In a power-press, a reciprocating hammer, a male-die connected therewith, a reciprocating clamp-die carrier, a clamp-die connected therewith, a driven shaft, eccentrics operated by said driven shaft, suspension rods connecting said eccentrics with said hammer, cam-members upon said driven shaft, a top-frame, brackets secured to said top-frame, lever-members pivotally connected with said brackets and adapted to be oscillated by said cam-members, adjustable connecting-rods connecting said lever-members with said clamp-die carrier, said carrier-members being arranged so as to cause a downward movement of said clamp-die carrier in advance of said hammer, springs connected, respectively, with said top-frame and said clamp-die carrier for retracting the latter, a female-die, and means for producing lateral movements of said female-die.

10. In a power-press, a reciprocating hammer, a male-die connected therewith, a reciprocating clamp-die carrier, a clamp-die connected therewith, the same being provided with a plurality of die-shaped members and a gage-surface on one of its lateral faces, a driven shaft, eccentrics operated by said driven shaft, suspension rods connecting said eccentrics with said hammer, cam-members upon said driven shaft, a top-frame, brackets secured to said top-frame, lever-members pivotally connected with said brackets and extending rearwardly beneath said cam-members, anti-friction rollers connected with said lever-members and adapted to be engaged by said cam-members, adjustable connecting rods connecting said lever-members with said clamp-die carrier, said cam-members being arranged so as to cause a downward movement of said clamp-die carrier in advance of said hammer, coiled springs connected, respectively, with said top-frame and said clamp-die carrier for retracting the latter, a female-die, and means for producing lateral movements of said female-die.

11. In a power-press, a reciprocating-hammer, a male-die connected therewith, a reciprocating clamp-die carrier, a clamp-die connected therewith, the same being provided with a plurality of die-shaped members and a gage-surface on one of its lateral faces, a driven shaft, eccentrics operated by said driven shaft, suspension rods connecting said eccentrics with said hammer, cam-members upon said driven shaft, a top-frame, brackets secured to said top-frame, lever-members pivotally connected with said brackets and extending rearwardly beneath said cam-members, anti-friction rollers connected with said lever members and adapted to be engaged by said cam-members, adjustable connecting rods connecting said lever-members with said clamp-die carrier, said cam-members being arranged so as to cause a downward movement of said clamp-die carrier in advance of said hammer, coiled springs connected, respectively, with said top-frame and said clamp-die carrier for retracting the latter, a female-die provided with a plurality of die-forms the complement of said male-die, and means for producing lateral movements of said female-die.

12. In a power-press, a reciprocating-hammer, a male-die connected therewith, a reciprocating clamp-die carrier, a clamp-die connected therewith, the same being provided with a plurality of die-shaped members and a gage-surface on one of its lateral faces, a driven shaft, eccentrics operated by said driven shaft, suspension rods connecting said eccentrics with said hammer, cam-members upon said driven shaft, a top-frame, brackets secured to said top-frame, lever-members pivotally connected with said brackets and extending rearwardly beneath said cam-members, anti-friction rollers connected with said lever-members and adapted to be engaged by said cam-members, adjustable connecting rods connecting said lever-members with said clamp-die carrier, said cam-members being arranged so as to cause a downward movement of said clamp-die carrier in advance of said hammer, coiled springs connected, respectively, with said top-frame and said clamp-die carrier for retracting the latter, a bed or supporting table, supporting brackets connected therewith, a female-die provided with a plurality of die-forms the complement of said male-die supported upon said bed or supporting table and said supporting brackets, racks secured to said female-die, a transverse shaft, bearings connected with certain of said supporting brackets for mounting said transverse shaft, gear-wheels upon said shaft in mesh with said racks, and means for rotating said transverse shaft and gear-wheels in either direction so as to produce lateral movements of said female-die.

13. In a power-press, a reciprocating-hammer, a male-die connected therewith, a reciprocating clamp-die carrier, a clamp-die connected therewith, the same being provided with a plurality of die-shaped members and a gage-surface on one of its lateral faces, a driven shaft, eccentrics operated by said driven shaft, suspension rods connecting said eccentrics with said hammer, cam-members upon said driven shaft, a top-frame, brackets secured to said top-frame, lever-members pivotally connected with said brackets and extending rearwardly beneath said cam-members, anti-friction rollers connected with said lever-members and adapted to be engaged by said cam-members, adjustable connecting rods connecting said lever-members with said clamp-die carrier, said cam-members being arranged so as to cause a downward movement of said clamp-die carrier in advance of said hammer, coiled springs connected, respectively, with said top-frame and said clamp-die carrier for retracting the latter, a bed or supporting table, supporting brackets connected therewith, a female-die provided with a plurality of die-forms the complement of said male-die supported upon said bed or supporting table and said supporting brackets, racks secured to said female-die, a transverse shaft, bearings connected with certain of said supporting brackets for mounting said transverse shaft, gear-wheels upon said shaft in mesh with said racks, and means for rotating said transverse shaft and gear-wheels in either direction so as to produce lateral movements of said female-die, comprising link-members pivotally mounted on said transverse shaft, a stud supported in the free ends of said link-members, a pawl-lever pivotally mounted on said stud, an upper and lower tooth connected with said pawl-lever either of which may be caused to engage the teeth of one of said gear-wheels, and stops for limiting the upward and downward movements of said pawl-lever.

14. In a power-press, a reciprocating hammer, a male-die connected therewith, a reciprocating clamp-die carrier, a clamp-die connected therewith, means for causing a downward movement of said clamp-die carrier in advance of said hammer, slide-blocks for slidably supporting said clamp-die carrier, studs for pivotally connecting said clamp-die carrier upon the slide-blocks, lock-screws carried by said clamp-die carrier for locking the latter in a rigid relation to said slide-blocks, a female die, and means for producing lateral movements of said female-die.

In testimony, that I claim the invention set forth above I have hereunto set my hand this 26th day of November, 1910.

GEORGE A. OHL, Jr.

Witnesses:
FREDK. C. FRAENTZEL,
FREDK. H. W. FRAENTZEL.